(12) United States Patent
Fuhse et al.

(10) Patent No.: US 9,274,258 B2
(45) Date of Patent: Mar. 1, 2016

(54) THIN-LAYER ELEMENT HAVING AN INTERFERENCE LAYER STRUCTURE

(75) Inventors: Christian Fuhse, Otterfing (DE); Michael Rahm, Bad Tolz (DE); Manfred Heim, Bad Tolz (DE); Ralf Liebler, Schliersee (DE)

(73) Assignee: Giesecke & Devrient GMBH, Munich (DE)

( * ) Notice: Subject to any disclaimer, the term of this patent is extended or adjusted under 35 U.S.C. 154(b) by 926 days.

(21) Appl. No.: 13/395,333

(22) PCT Filed: Sep. 10, 2010

(86) PCT No.: PCT/EP2010/005563
§ 371 (c)(1),
(2), (4) Date: Mar. 9, 2012

(87) PCT Pub. No.: WO2011/032665
PCT Pub. Date: Mar. 24, 2011

(65) Prior Publication Data
US 2012/0170124 A1 Jul. 5, 2012

(30) Foreign Application Priority Data
Sep. 15, 2009 (DE) .......................... 10 2009 041 583

(51) Int. Cl.
*G02B 5/28* (2006.01)
*B42D 25/29* (2014.01)

(52) U.S. Cl.
CPC ............... *G02B 5/285* (2013.01); *B42D 25/29* (2014.10); *B42D 2035/24* (2013.01); *B42D 2035/36* (2013.01)

(58) Field of Classification Search
CPC .................. B42D 2035/24; B42D 2035/36
USPC ........ 359/2, 577–590; 283/85, 87–91
See application file for complete search history.

(56) References Cited

U.S. PATENT DOCUMENTS

| 3,858,977 A | 1/1975 | Baird et al. |
| 6,031,653 A * | 2/2000 | Wang ............................ 359/247 |
| 7,667,894 B2 | 2/2010 | Hoffmuller |

(Continued)

FOREIGN PATENT DOCUMENTS

| CN | 1608217 A | 4/2005 |
| CN | 1628039 A | 6/2005 |

(Continued)

OTHER PUBLICATIONS

Ordal et al., Optical properties of Au, Ni, and Pb at submillimeter wavelengths, Applied Optics vol. 26, No. 4, pp. 744-752 (Feb. 15, 1987).*

(Continued)

*Primary Examiner* — Kimberly N Kakalec
(74) *Attorney, Agent, or Firm* — Lathrop & Gage LLP

(57) ABSTRACT

The present invention relates to a thin-film element (30) having an interference layer structure for security papers, value documents and the like, having at least two semitransparent absorber layers (34, 38) and at least one dielectric spacing layer (36) arranged between the at least two absorber layers. According to the present invention, it is provided that the two absorber layers (34, 38) are each formed from a material having a complex refractive index N whose real part n and imaginary part k differ at least in a portion of the visible spectral range by a factor of 5 or more.

32 Claims, 5 Drawing Sheets

(56) References Cited

U.S. PATENT DOCUMENTS

Figure 1:
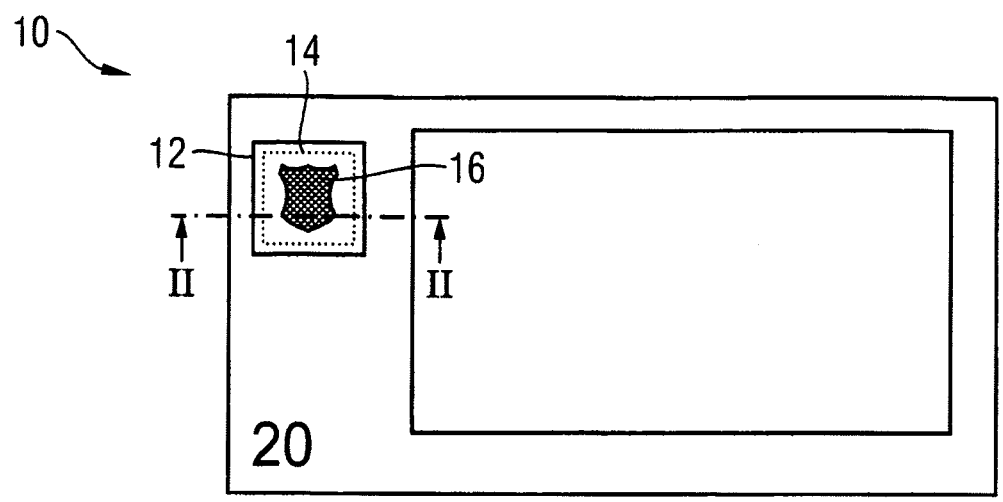

| | | |
|---|---|---|
| 7,699,350 B2 | 4/2010 | Heim |
| 7,728,931 B2 | 6/2010 | Hoffmuller |
| 7,808,605 B2 | 10/2010 | Hoffmuller |
| 7,986,459 B2 | 7/2011 | Kaule |
| 8,083,894 B2 | 12/2011 | Gruszczynski |
| 8,149,511 B2 | 4/2012 | Kaule |
| 2001/0028921 A1 | 10/2001 | Shaw et al. |
| 2004/0240006 A1* | 12/2004 | Staub et al. ............ 359/2 |
| 2005/0151368 A1 | 7/2005 | Heim |
| 2007/0165182 A1 | 7/2007 | Hoffmuller |
| 2007/0211238 A1 | 9/2007 | Hoffmuller |
| 2007/0216518 A1 | 9/2007 | Hoffmuller |
| 2007/0229928 A1 | 10/2007 | Hoffmuller |
| 2007/0241553 A1 | 10/2007 | Heim |
| 2007/0246933 A1 | 10/2007 | Heim |
| 2007/0274559 A1 | 11/2007 | Depta |
| 2008/0014378 A1 | 1/2008 | Hoffmuller |
| 2008/0054621 A1 | 3/2008 | Burchard |
| 2008/0079257 A1 | 4/2008 | Fessl |
| 2008/0088859 A1 | 4/2008 | Depta |
| 2008/0160226 A1 | 7/2008 | Kaule |
| 2008/0163994 A1 | 7/2008 | Hoppe |
| 2008/0198468 A1 | 8/2008 | Kaule |
| 2008/0216976 A1 | 9/2008 | Ruck |
| 2008/0250954 A1 | 10/2008 | Depta |
| 2008/0258456 A1 | 10/2008 | Rahm |
| 2009/0001709 A1 | 1/2009 | Kretschmar |
| 2009/0008923 A1 | 1/2009 | Kaule |
| 2009/0008926 A1 | 1/2009 | Depta |
| 2009/0102605 A1 | 4/2009 | Kaule |
| 2009/0115185 A1 | 5/2009 | Hoffmuller |
| 2009/0236061 A1 | 9/2009 | Gruszczynski |
| 2009/0297805 A1 | 12/2009 | Dichtl |
| 2009/0322071 A1 | 12/2009 | Dichtl |
| 2010/0175843 A1 | 7/2010 | Gregarek |
| 2010/0177094 A1 | 7/2010 | Kaule |
| 2010/0182221 A1 | 7/2010 | Kaule |
| 2010/0194091 A1 | 8/2010 | Heim |
| 2010/0194532 A1 | 8/2010 | Kaule |
| 2010/0196587 A1 | 8/2010 | Keller |
| 2010/0207376 A1 | 8/2010 | Heim |
| 2010/0208036 A1 | 8/2010 | Kaule |
| 2010/0307705 A1 | 12/2010 | Rahm |
| 2010/0308570 A1 | 12/2010 | Heim |
| 2010/0320742 A1 | 12/2010 | Hoffmuller |
| 2011/0007374 A1 | 1/2011 | Heim |
| 2011/0012337 A1 | 1/2011 | Heim |
| 2011/0027538 A1 | 2/2011 | Hoffmann |
| 2011/0045248 A1 | 2/2011 | Hoffmuller |
| 2011/0069360 A1 | 3/2011 | Dichtl |
| 2011/0079997 A1 | 4/2011 | Heim |
| 2011/0091665 A1 | 4/2011 | Heim |
| 2011/0095518 A1 | 4/2011 | Hoffmuller |
| 2011/0101670 A1 | 5/2011 | Heim |
| 2011/0109078 A1 | 5/2011 | Hoffmuller |
| 2011/0114733 A1 | 5/2011 | Heim |
| 2011/0157183 A1 | 6/2011 | Kaule |
| 2012/0126525 A1 | 5/2012 | Dorfler |
| 2012/0168515 A1 | 7/2012 | Schutzmann |
| 2012/0170124 A1 | 7/2012 | Fuhse |

FOREIGN PATENT DOCUMENTS

| | | |
|---|---|---|
| CN | 1630587 A | 6/2005 |
| EP | 0395410 A2 | 10/1990 |
| EP | 0733919 A | 9/1996 |
| EP | 1189079 A1 | 3/2002 |
| WO | WO 02/00445 A1 | 1/2002 |
| WO | WO 03/068525 A1 | 8/2003 |

OTHER PUBLICATIONS

International Search Report, International Application No. PCT/EP2010/005563, 3 pages, Jan. 25, 2011.

International Preliminary Report on Patentability, International Application No. PCT/EP2010/005563, 10 pages, May 10, 2012, English Translation.

Chinese First Office Action, dated Dec. 10, 2013, in counterpart Chinese Patent Application No. 201080041164.9, 21 pp (with English translation).

Disheng, Zhong, Vacuum Coating: Selection and Application of Optical Material, Liaoning University Press, Dec. 20, 2001, pp. 62 and 87 (in Chinese language); 3 pages.

* cited by examiner

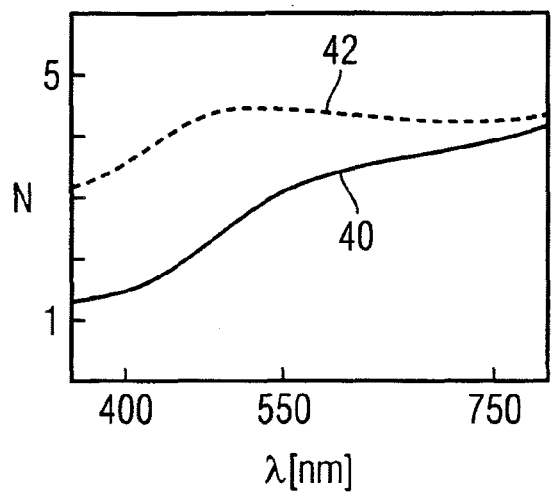
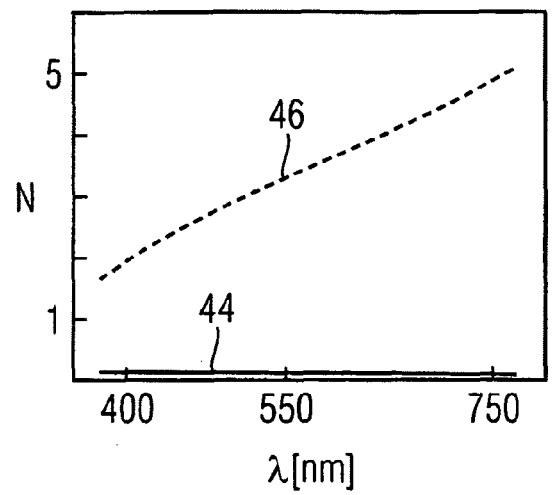
Fig. 3a
Fig. 3b
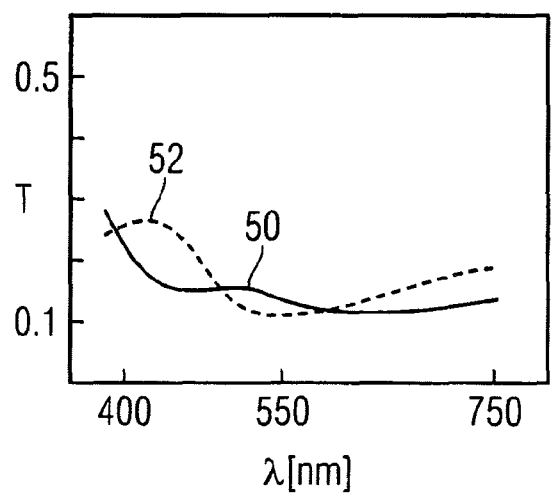
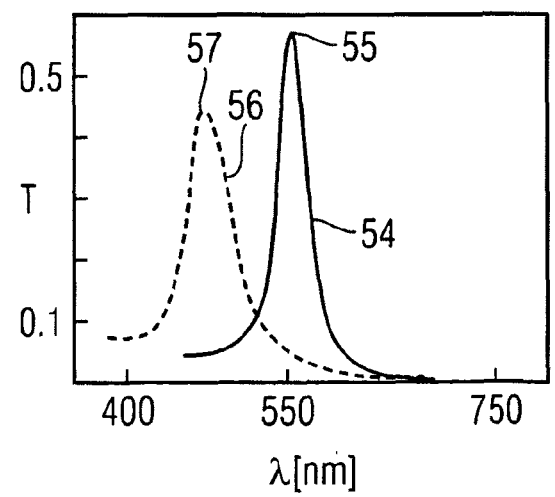
Fig. 4a
Fig. 4b

THIN-LAYER ELEMENT HAVING AN INTERFERENCE LAYER STRUCTURE

CROSS-REFERENCE TO RELATED APPLICATIONS

This application is the U.S. National Stage of International Application No. PCT/EP2010/005563, filed Sep. 10, 2010, which claims the benefit of German Patent Application DE 10 2009 041 583.1, filed Sep. 15, 2009, both of which are hereby incorporated by reference to the extent not inconsistent with the disclosure herewith.

The present invention relates to a thin-film element having an interference layer structure for security papers, value documents and the like, having at least two semitransparent, i.e. partially transparent absorber layers and at least one dielectric spacing layer arranged between the at least two absorber layers. The present invention further relates to a see-through security element and a data carrier having such a thin-film element, as well as, for a printing ink, optically variable color pigments that are formed by such thin-film elements.

For protection, data carriers, such as value or identification documents, or other valuable articles, such as branded articles, are often provided with security elements that permit the authenticity of the data carriers to be verified, and that simultaneously serve as protection against unauthorized reproduction. For several years now, see-through windows have proven to be attractive security elements in polymer and, most recently, also in paper banknotes, since they permit the use of a number of security features.

Security elements having viewing-angle-dependent effects play a special role in safeguarding authenticity, as these cannot be reproduced even with the most modern copiers. Here, the security elements are furnished with optically variable elements that, from different viewing angles, convey to the viewer a different image impression and, depending on the viewing angle, display for example another color or brightness impression and/or another graphic motif.

In this connection, it is known to use security elements having multilayer thin-film elements whose color impression for the viewer changes with the viewing angle, and when the thin-film element is tilted, shifts for example from green to blue, from blue to magenta or from magenta to green. The occurrence of such color changes when a thin-film element is tilted is referred to in the following as a color-shift effect.

Proceeding from this, the object of the present invention is to specify a thin-film element of the kind cited above having an attractive visual appearance having high counterfeit security.

This object is solved by the thin-film element, the see-through security element, the optically variable color pigments and the data carrier having the features of the independent claims. Developments of the present invention are the subject of the dependent claims.

According to the present invention, in a generic thin-film element, the two absorber layers are each formed from a material having a complex refractive index $N=n+ik$ whose real part n and imaginary part k differ at least in a portion of the visible spectral range by a factor of 5 or more.

Here, the two absorber layers can be formed from the same material or also from different materials. The use of different materials can be advantageous especially from production technology perspectives, for example to ensure a good layer adhesion also of the top absorber layer. In a preferred embodiment, the two absorber layers are thus formed from different materials, the real part n1 and imaginary part k1 of the material of one of the two absorber layers differing at least in a portion of the visible spectral range by a factor of 5 or more, and the real part n2 and imaginary part k2 of the material of the other of the two absorber layers by a factor of 8 or more, preferably by a factor of 10 or more, particularly preferably by a factor of 15 or more.

In advantageous embodiments, the real part n and imaginary part k of the materials of both absorber layers differ at least in a portion of the visible spectral range by even a factor of 8 or more, preferably by a factor of 10 or more, particularly preferably by a factor of 15 or more. Preferably, the real part n and imaginary part k of the material of at least one of the two absorber layers differ even in the entire visible spectral range by a factor of 5 or more, by a factor of 8 or more, by a factor of 10 or more or by a factor of 15 or more.

At least one of the absorber layers, preferably both absorber layers, are advantageously formed from silver. Also embodiments in which one of the absorber layers or both absorber layers are formed from aluminum have proven reliable. The most colorful colors in transmission are currently achieved with silver/dielectric/silver layer systems. Somewhat less colorful, but easier to manufacture, are thin-film elements having an aluminum/dielectric/aluminum layer system. Likewise easy to manufacture are silver/dielectric/aluminum layer systems whose colorfulness lies between the two above-mentioned layer systems and that, for a top-lying aluminum layer, likewise permit manufacture without the occurrence of layer adhesion problems.

The layer thicknesses of the two absorber layers and the dielectric layer are preferably coordinated with each other in such a way that the thin-film element exhibits a sufficient transmission corresponding to a brightness L*, specified in the CIELAB color space, of between 10% and 70%, preferably between 20% and 50%. When silver is used as the absorber material, the layer thickness of the silver layers is advantageously between 20 nm and 30 nm.

In an advantageous variant of the present invention, the interference layer structure of the thin-film element is a symmetrical three-layer structure having a first absorber layer, a dielectric spacing layer and a second absorber layer that consists of the same material as the first absorber layer and exhibits the same layer thickness as the first absorber layer. Here, the interference layer structure can especially be a silver/dielectric/silver layer system or an aluminum/dielectric/aluminum layer system.

In an alternative, likewise advantageous variant of the present invention, the interference layer structure is an asymmetrical three-layer structure having a first absorber layer composed of a first material, a dielectric spacing layer and a second absorber layer composed of a second, different material. In this case, the interference layer structure is especially a silver/dielectric/aluminum layer system.

The dielectric spacing layer is advantageously formed from $SiO_x$ or $MgF_2$. The layer thickness of the dielectric spacing layer is typically between 90 nm and 400 nm. Since the layer thickness of the dielectric spacing layer substantially determines the color impression of the thin-film element, as explained in greater detail below, it is chosen according to the desired color impression and the desired intensity of the color-shift effect.

In an advantageous embodiment, the thin-film element appears shiny metallic and substantially color neutral when viewed in reflected light, and appears colored in transmitted light. Here, in transmitted light, the thin-film element advantageously exhibits, specified in the CIELAB color space, a chroma $C^*_{ab}$ of more than 15, preferably of more than 20, particularly preferably of more than 25.

In an advantageous variant of the present invention, when viewed vertically in transmitted light, the thin-film element appears green and exhibits a chroma $C^*_{ab}$ of more than 30, preferably of more than 40. In another advantageous variant of the present invention, when viewed vertically in transmitted light, the thin-film element appears yellow and exhibits a chroma $C^*_{ab}$ of more than 10, preferably of more than 20. In a further advantageous variant of the present invention, when viewed vertically in transmitted light, the thin-film element appears red and exhibits a chroma $C^*_{ab}$ of more than 20, preferably of more than 30. In yet a further advantageous variant of the present invention, when viewed vertically in transmitted light, the thin-film element appears blue and exhibits a chroma $C^*_{ab}$ of more than 20, preferably of more than 30.

In a preferred variant of the present invention, the thin-film element appears colored in transmitted light and, in transmitted light, exhibits a color-shift effect in which the color impression changes in transmitted light when the thin-film element is tilted. Here, the color impression in transmitted light can change, for example, from magenta when looked through vertically to green when looked through obliquely. In an alternative, likewise advantageous variant of the present invention, the thin-film element appears colored in transmitted light and, when tilted, remains substantially color constant, but with a changed chroma $C^*_{ab}$ of the see-through color. Here, the color impression in transmitted light can be, for example, blue, the chroma of the blue see-through color changing from a high value when looked through vertically to a lower value when looked through obliquely. In this variant, when the thin-film element is tilted, only the saturation of the perceived blue see-through color changes.

In a development of the present invention, the thin-film element is combined with a color filter, preferably a colored printing layer or a colored vapor deposition layer. Here, the thin-film element and the color filter can be coordinated with each other in such a way that, in a predetermined viewing direction, the thin-film element and the color filter each transmit substantially only in different, non-overlapping wavelength ranges. IFor this viewing direction, the combination of thin-film element and color filter then appears black, since no color is simultaneously transmitted by both elements. For other viewing directions, the wavelength range in which the thin-film element transmits shifts such that said wavelength range overlaps with the wavelength range in which the color filter transmits. Consequently, a certain portion of the light is transmitted by both elements. In this way, see-through security elements can be created that display a shift from black or to black and that often seem particularly striking for the viewer.

In advantageous embodiments, the thin-film element is present in the form of patterns, characters or a code. This also includes the possibility that a contiguous thin-film element is provided with gaps in the form of patterns, characters or a code.

The thin-film element according to the present invention can advantageously be combined with a relief structure, such as a diffractive relief structure (e.g. hologram), a microoptical relief structure (e.g. microlens structure, 3D depiction composed of sawtooth structures) or a sub-lambda structure (e.g. subwavelength gratings, moth-eye structures) and can especially be applied to such a relief structure. In this way, it is possible to combine the optically variable effects of the mentioned relief structures with the described conspicuous transmission color effect and, if applicable, the conspicuous transmission color-shift effect.

The thin-film element according to the present invention can also be combined with other optically variable coatings, especially with coatings that themselves exhibit a combination of color variable and color constant regions.

The present invention also comprises a see-through security element for security papers, value documents and the like, having a support and, applied to the support, a thin-film element of the kind described. Here, the thin-film element is advantageously applied to the support in the form of a motif. In an advantageous embodiment, the thin-film element is additionally provided on its top opposite the support with an ink absorption layer. The ink absorption layer is preferably opaque white.

In the latter case, the thin-film element can be embedded, for example, in a security paper or another data carrier and form there a colored, watermark-like element. For this, the thin-film element is applied to a foil strip in at least some regions, especially in the form of a motif. In the case of a composite banknote, said foil strip is then adhered to the paper and printed on the top with a white ink absorption layer, such that the region having the thin-film element is practically not perceptible in top view. But when looked through, the thin-film element then nevertheless appears colored. Surprisingly, it proved that, in transmission, especially thin-film elements that appear green when looked through are also still clearly perceptible as colored through a paper layer of typical thickness, and due to the different visual impression in reflected light and transmitted light, form watermark-like and, moreover, colored elements.

Particularly advantageously, a further see-through security element for a window is located in another region on the same foil strip, such that the window element and the colored, watermark-like element can be manufactured in the same operations.

Further, the present invention includes, for a printing ink, optically variable color pigments that are formed by thin-film elements of the kind described.

Finally, the present invention also includes a data carrier having a thin-film element or a see-through security element of the kind described, the thin-film element or the see-through security element being arranged especially in or over a transparent window region or a through opening in the data carrier. The present invention also includes a data carrier having a thin-film element or a see-through security element of the kind described, in which the thin-film element or the see-through security element is embedded in the data carrier. The data carrier can especially include a paper substrate in which the thin-film element or the see-through security element is embedded.

The data carrier can especially be a value document, such as a banknote, especially a paper banknote, a polymer banknote or a foil composite banknote, or an identification card, such as a credit card, bank card, cash card, authorization card, personal identity card or a passport personalization page.

Further exemplary embodiments and advantages of the present invention are explained below by reference to the drawings, in which a depiction to scale and proportion was omitted in order to improve their clarity. The different exemplary embodiments are also not limited to the use in the form specifically described, but rather can also be combined with one another.

Figure 2:
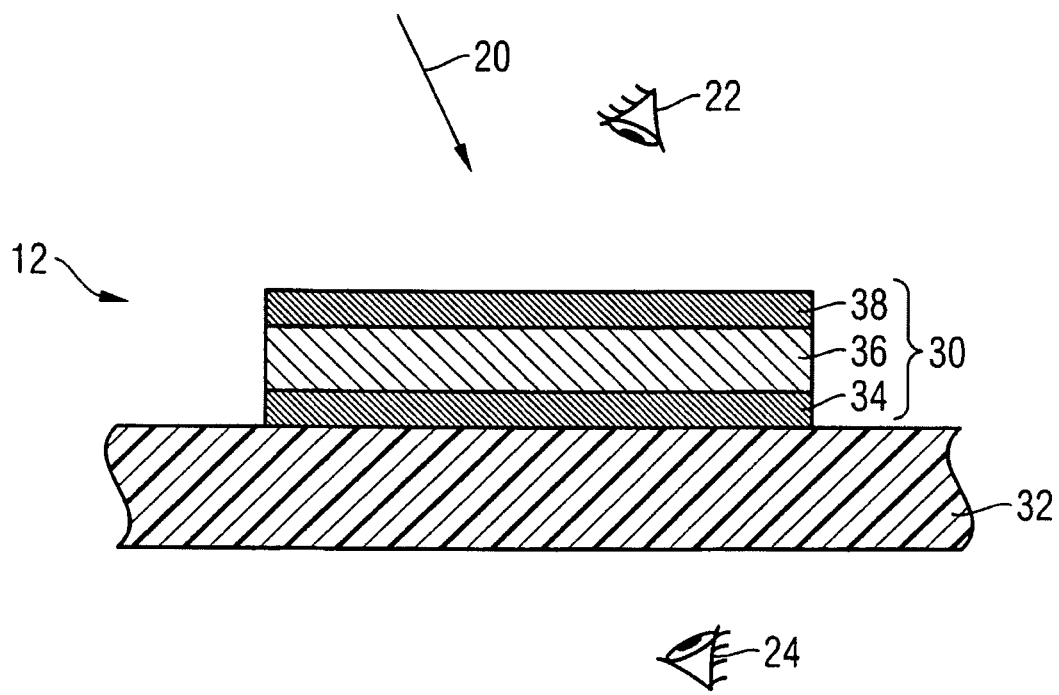
Figure 5:
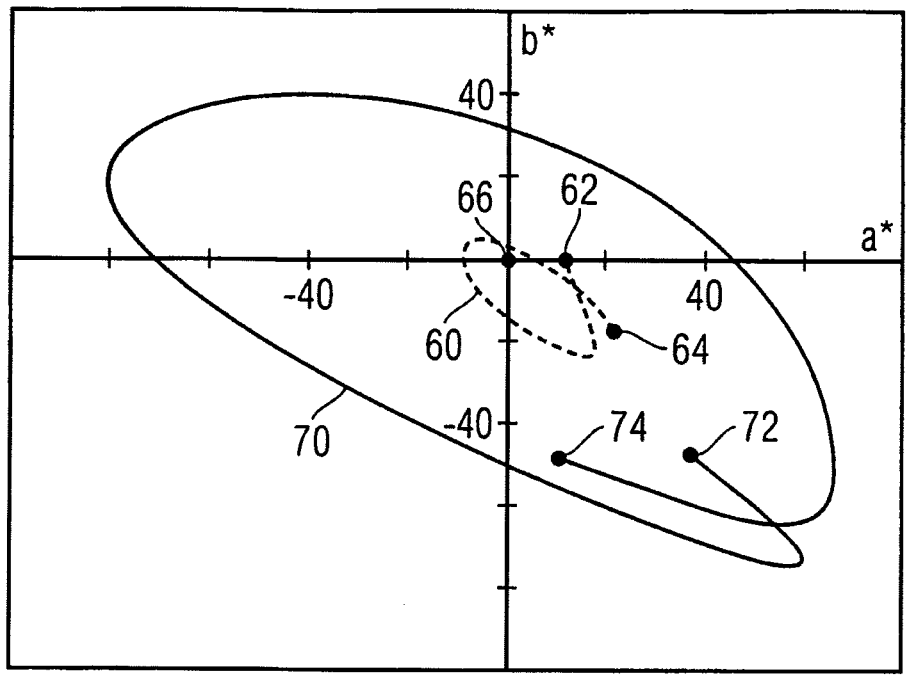
Figure 6:
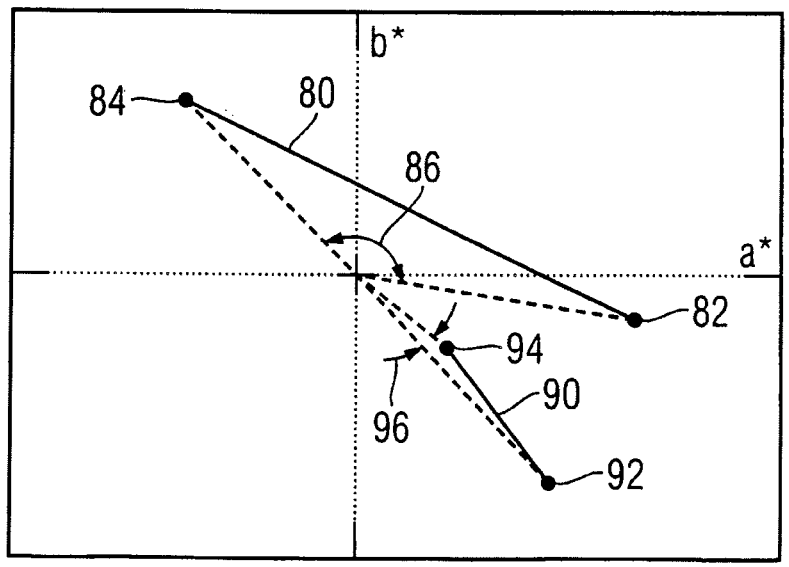
Figure 7:
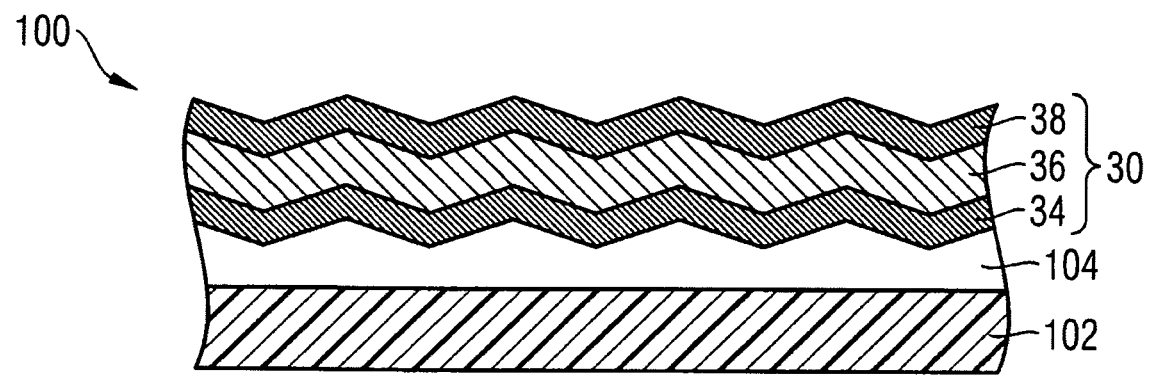
Figure 8:
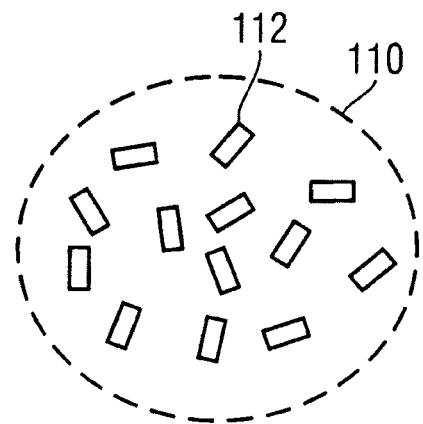

Shown are:

FIG. 1 a schematic diagram of a banknote having a see-through security element according to the present invention, FIG. 2 the see-through security element in FIG. 1 along the line II-II, in cross section, FIG. 3 the curve of the real part n (solid) and of the imaginary part k (dotted) of the complex refractive index N=n+ik in the visible spectral range, in (a) for chrome and in (b) for silver, FIG. 4 transmission spectra of symmetrical absorber/dielectric/absorber structures, each when viewed vertically (solid) and when viewed obliquely (dotted), in (a) for chrome and in (b) for silver, FIG. 5 the calculated color coordinates of the transmission for a conventional chrome/dielectric/chrome layer system (dotted) and a silver/dielectric/silver layer system according to the present invention (solid) in an a*b* coordinate system, FIG. 6 the calculated color coordinates of the transmission for two silver/dielectric/silver layer systems according to the present invention when viewed vertically and obliquely in an a*b* coordinate system, FIG. 7 a see-through security element according to an exemplary embodiment of the present invention, in which the thin-film element is combined with a hologram embossing pattern, and FIG. 8 a printing ink having optically variable color pigments according to an exemplary embodiment of the present invention.

Figure 9:
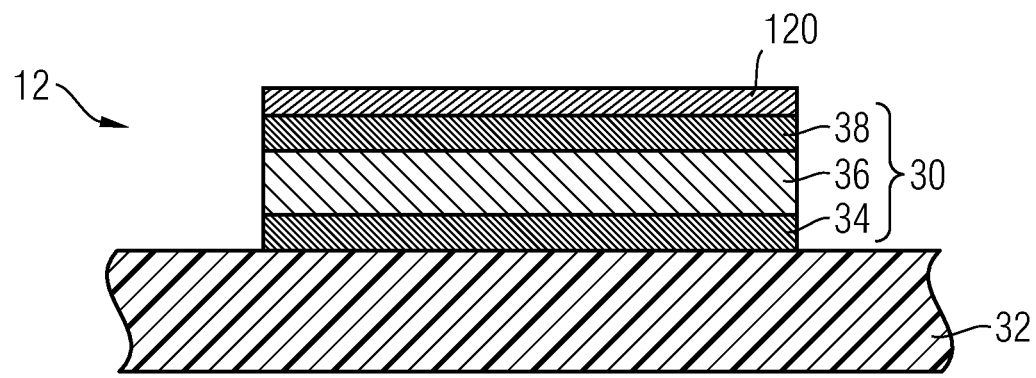

FIG. 9 a security element with illustration of a color filter 120.

Figure 10:
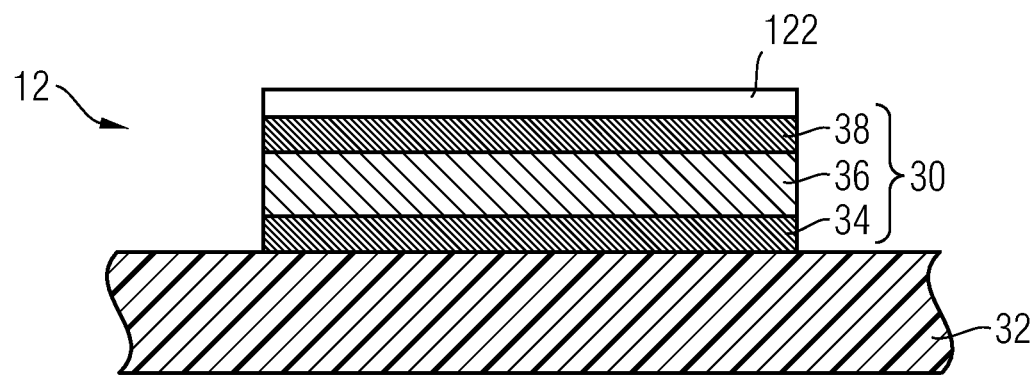

FIG. 10 a security element with illustration of an ink absorption layer 122.

The invention will now be explained using the example of security elements for banknotes. For this, FIG. 1 shows a schematic diagram of a banknote 10 having a through opening 14 that is covered by a see-through security element 12 according to the present invention. FIG. 2 shows the see-through security element 12 along the line II-II in FIG. 1, in cross section.

The see-through security element 12 includes a motif 16 that, for illustration, is depicted in FIG. 1 as a crest motif 16. In other embodiments, however, the motif 16 can depict arbitrary patterns, characters or codes, especially also an alphanumeric character string, such as the denomination of the banknote 10. Upon viewing the see-through security element in reflected light, with the viewer 22 being on the same side as the incident light 20, the motif 16 produces a shiny metallic and substantially colorless visual impression.

If, in contrast, the see-through security element 12 is viewed in transmitted light (viewing position 24), for example in that the banknote 10 is held in front of a light source or up to daylight, then the motif 16 appears for the viewer 24 having vibrant, rich colors that, moreover, change with the tilt angle of the banknote 10. For example, the motif 16 appears, when looked through vertically, having a vibrant green hue that, when the banknote is tilted, changes into a rich blue when looked through obliquely.

The rich and vibrant color impression when looking through a security element that appears metallic and colorless in reflected light contradicts ordinary viewing habits and thus has a high attention and recognition value. This is further intensified by the color change when the banknote 10 is tilted, especially since the color change is very conspicuous due to the rich colors.

To produce the mentioned color effects, the see-through security element 12 includes, with reference to FIG. 2, a transparent plastic foil 32 to which a three-layer, symmetrical thin-film element 30 is applied having an interference layer structure in the form of the desired motif 16. The thin-film element 30 consists of a first semitransparent absorber layer 34 that, in the exemplary embodiment, is formed by a 25 nm thick silver layer, a dielectric spacing layer 36 that, in the exemplary embodiment, is formed by a 270 nm thick $SiO_2$ layer, and a second semitransparent absorber layer 38 that, in the exemplary embodiment, is formed by a further 25 nm thick silver layer.

The distinctive feature of the layer structure according to the present invention consists in that, for the two semitransparent absorber layers 34, 38, a material is used in whose complex refractive index N=n+ik the real part n and the imaginary part k differ significantly at least in a portion of the visible spectral range, namely by more than a factor of 5. In contrast, in the materials conventionally used for absorber layers of thin-film elements, such as chrome, nickel or palladium, the values for the real part n and the imaginary part k of the complex refractive index N are always on the same order of magnitude.

These different properties are illustrated in FIG. 3, where the curve of the real part n and of the imaginary part k of the complex refractive index N are each shown as a function of the wavelength, in FIG. 3(a) for chrome and in FIG. 3(b) for silver. As perceptible from FIG. 3(a), for chrome, the values of n (curve 40, solid) and k (curve 42, dotted) are on the same order of magnitude in the entire visible spectral range and differ nowhere by more than about a factor of 2.5. In contrast, the corresponding curves for n and k of silver in FIG. 3(b) show that the imaginary part k (curve 46, dotted) of silver is about 10 to 30 times as large as the real part n (curve 44, solid) in the visible spectral range.

The present inventors have now found that this large difference in the values of n and k when these materials are used as absorber layers of interference layer elements surprisingly produces an intense coloring of the transmission. At the same time, the reflection remains substantially colorless and thus appears color neutral to the viewer. This behavior is illustrated in FIG. 4, where the transmission spectra of symmetrical absorber/dielectric/absorber structures are shown when viewed vertically and when viewed obliquely, respectively.

FIG. 4(a) shows, first, the transmission of a conventional symmetrical chrome/dielectric/chrome structure when viewed vertically (curve 50, solid) and when viewed obliquely (curve 52, dotted). The layer thicknesses in the structure measure preferably 300 nm for the dielectric layer and 8 nm for the chrome layers. In both cases, the transmission spectra have a substantially flat curve, such that the transmitted light exhibits hardly any color saturation and thus appears grayish. Accordingly, see-through security elements on the basis of a chrome/dielectric/chrome thin-film element are optically little conspicuous.

In contrast, the transmission spectra of a symmetrical silver/dielectric/silver structure both when viewed vertically (curve 54, solid) and when viewed obliquely (curve 56, dotted) display clearly pronounced maxima 55 and 57, and thus a strong coloring of the transmitted light. The layer thicknesses in the structure are preferably 300 nm for the dielectric layer and 25 nm for the silver layers.

When viewed vertically (curve 54), the maximum 55 is about 560 nm at the boundary between yellow and green. If the viewer tilts the see-through security element, then the transmission maximum shifts to the short-wave range. When viewed vertically at 60° (curve 56), the maximum 57 is between 450 nm and 500 nm and displays a rich blue there. Due to the vibrant colors and the clear change in the hue, also the see-through color-shift effect is very conspicuous and memorable for the viewer.

The coloring of the transmission can be characterized more precisely in the CIELAB color space by specifying the chroma of the see-through color. In the CIELAB color space, every color is described by three coordinates L*, a* and b*, the variable L* corresponding to the brightness and being able to take on values from 0 to 100. The a* axis describes the green or red portion of a color, negative values of a* standing for green and positive values for red. The b* axis describes the blue or yellow portion of a color, negative values of b* standing for blue and positive values for yellow. The scales of the a* axis and the b* axis comprise a range of numbers from −150 to +100 or from −100 to +150, where, however, not all combinations correspond to a perceptible color.

To specify how vibrant or brilliant a color is, the chroma is used, which is given by in other words, the distance of a color coordinate (a*, b*) from the origin (0, 0). The larger the chroma, the more vibrant or brilliant the respective color appears. For a chroma of 0, a black, gray or white color impression results, depending on the brightness.

The hue of a color can be specified by the color angle, which is given by

A pale and a vibrant color of a certain hue have the same color angle, but different chroma.

FIG. 5 now shows, schematically, the calculated color coordinates (a*, b*) of the transmission for a conventional chrome/dielectric/chrome layer system (curve 60, dotted) and a silver/dielectric/silver layer system (curve 70, solid) according to the present invention in an a*b* coordinate system. The color coordinates are each indicated by the curves 60, 70 for a plurality of layer thicknesses of the dielectric ($SiO_2$) between d =200 nm (each at the starting point 62 or 72) and d=400 nm (each at the end point 64 or 74). Here, the color of the transmitted light depends not only on the layer system, but also on the light source used. The calculation in FIG. 5 was made on the basis of the standard light source D65 commonly used in Europe, which corresponds to a color temperature of 6500 K.

In the diagram in FIG. 5, for every color coordinate (a*, b*), the chroma Cab is given according to the above-mentioned relationship by the distance of the color coordinate (a*, b*) from the origin 66 of the coordinate system.

As immediately evident from FIG. 5, all color angles in the depicted layer thickness range of the dielectric layer are covered by both silver/dielectric/silver layer systems according to the present invention (curve 70) and by conventional chrome/dielectric/chrome layer systems (curve 60). However, a substantial difference between the conventional layer systems and those according to the present invention consists in the chroma, in other words the distance of the color coordinates from the origin 66, which is extraordinarily high in the layer systems according to the present invention (curve 70) compared with the conventional layer systems (curve 60).

Here, the chroma of silver/dielectric/silver layer systems according to the present invention is normally even many times greater than the chroma of conventional chrome/dielectric/chrome layer systems. For example, the chroma of a silver/dielectric/silver system in transmission is about $C^*_{ab}$=70 in green (−a* axis), while the chroma of a chrome/dielectric/chrome system is only about $C^*_{ab}$=10 in the same hue. In transmission in yellow (+b* axis), a chroma value $C^*_{ab}$=33 for the silver/dielectric/silver system stands opposite a chroma value of $C^*_{ab}$=4 for the chrome/dielectric/chrome system. The relationships are similar for red (+a* axis), blue (−b* axis) and the colors mixed from red, blue, yellow and green.

The total brightness L*, in other words the weighted average transmittance of the layer systems across the visible spectral range, is comparable for the chosen layer thicknesses for the silver layers (25 nm) and the chrome layers (8 nm), and is between about 20% and about 50% in each case.

The present inventors further surprisingly found that, through a suitable choice of the layer thickness of the dielectric layer, it is possible to produce both thin-film elements that display, in transmission, a high coloring and a strong color-shift effect, and thin-film elements that, in transmission, do display a high coloring but hardly change their color when tilted.

In the latter case, particularly easily understandable see-through security elements can be created that do display a conspicuous contrast between their appearance in top view (metallic and substantially colorless) and when looked through (strong, saturated colors), but that practically do not change their see-through color when the security element is tilted.

Both variants of the present invention are illustrated in FIG. 6, which shows the calculated color coordinates of the transmission in an a*b* coordinate system for two silver/dielectric/silver layer systems according to the present invention.

The first layer system exhibits two 25 nm thick silver layers between which a 340 nm thick $SiO_2$ layer is arranged as the dielectric layer. In this variant, the color coordinates of the transmission of the layer system are in red when viewed vertically 82 and in yellow when viewed obliquely 84. As evident in FIG. 6, the two color coordinates 82, 84 enclose a very large color angle 86, such that the first layer system, when tilted, displays a pronounced color-shift effect from red to yellow, approximately along the line 80.

The second layer system exhibits two 25 nm thick silver layers between which a 200 nm thick $SiO_2$ layer is arranged as the dielectric layer. In this variant, the color coordinates of the transmission of the layer system are in blue both when viewed vertically 92 and when viewed obliquely 94. The two color coordinates 92, 94 enclose only a very small color angle 96, such that the color impression of the second layer system, when tilted, remains nearly unchanged. In this variant of the present invention, the tilting of the layer system when looked through does not change the color coordinates, but changes only approximately along the line 90 the chroma of the perceived blue see-through color, which, however, will hardly attract the attention of the casual viewer "on the street."

The exemplary embodiment in FIG. 7 shows a see-through security element 100 in which a thin-film element according to the present invention is combined with a hologram embossing pattern.

For this, a transparent embossing lacquer layer 104 having the desired hologram embossing pattern was first applied to a transparent foil substrate 102. After the application of a primer layer, not depicted, a thin-film element having an interference layer structure, for example a thin-film element 30 of the kind described for FIG. 2, was then vapor deposited on the embossing pattern. In this way, it is possible to combine the optically variable effects of the hologram embossing pattern with the above-described conspicuous transmission color effect. For example, the thin-film element can appear in the window of a banknote in the form of a forward- or backward-bulging number or of a forward- or backward-bulging symbol.

The described thin-film elements can also be used to manufacture printing inks having optically variable color pigments. Such a printing ink is depicted schematically in FIG. 8. To manufacture the printing ink 110, a large-area thin-film element is first applied to a support foil of the kind described above. The thin-film element is mechanically scraped from the support foil and, if needed, the scraped flakes milled to a desired particle size. The resulting interference layer particles are then introduced into a binder in the printing ink 110 as optically variable color pigments 112. In this way, it is possible to easily and economically manufacture a number of different pigments having an optically appealing color impression.

The invention claimed is:

1. A thin-film element comprising an interference layer structure for security papers, value documents and the like, comprising at least two semitransparent absorber layers and at least one dielectric spacing layer arranged between the at least two absorber layers, in which
    the two absorber layers are each formed from a material having a complex refractive index N whose real part n and imaginary part k differ at least in a portion of the visible spectral range by a factor of 5 or more,
    the thin-film element is configured to appear shiny metallic and substantially color neutral when viewed in reflected light and colored in transmitted light, the thin-film element configured to exhibit a chroma $C^*_{ab}$, specified in the CIELAB color space, of more than 15 in transmitted light; and
    wherein when viewed vertically, the thin-film element is configured to appear
    green in transmitted light and exhibits a chroma $C^*ab$ of more than 40, or
    yellow in transmitted light and exhibits a chroma $C^*ab$ of more than 20, or
    red in transmitted light and exhibits a chroma $C^*ab$ of more than 30, or
    blue in transmitted light and exhibits a chroma $C^*ab$ of more than 30.

2. The thin-film element according to claim 1, characterized in that the two absorber layers are formed from different materials, the real part n1 and imaginary part k1 of the material of one of the two absorber layers differing at least in a portion of the visible spectral range by a factor of 5 or more, and the real part n2 and imaginary part k2 of the material of the other of the two absorber layers differing by a factor of 8 or more.

3. The thin-film element according to claim 2, characterized in that the real part n2 and imaginary part k2 of the material of the other of the two absorber layers differ by a factor of 10 or more.

4. The thin-film element according to claim 2, characterized in that the real part n2 and imaginary part k2 of the material of the other of the two absorber layers differ by a factor of 15 or more.

5. The thin-film element according to claim 1, characterized in that the real part n and imaginary part k of the materials of both absorber layers differ at least in a portion of the visible spectral range by a factor of 8 or more.

6. The thin-film element according to claim 5, characterized in that the real part n and imaginary part k of the materials of both absorber layers differ at least in a portion of the visible spectral range by a factor of 10 or more.

7. The thin-film element according to claim 5, characterized in that the real part n and imaginary part k of the materials of both absorber layers differ at least in a portion of the visible spectral range by a factor of 15 or more.

8. The thin-film element according to claim 1, characterized in that the real part n and imaginary part k of the material of at least one of the two absorber layers differ in the entire visible spectral range by a factor of 5 or more.

9. The thin-film element according to claim 8, characterized in that the real part n and imaginary part k of the material of at least one of the two absorber layers differ in the entire visible spectral range by a factor of 8 or more.

10. The thin-film element according to claim 8, characterized in that the real part n and imaginary part k of the material of at least one of the two absorber layers differ in the entire visible spectral range by a factor of 10 or more.

11. The thin-film element according to claim 8, characterized in that the real part n and imaginary part k of the material of at least one of the two absorber layers differ in the entire visible spectral range by a factor of 15 or more.

12. The thin-film element according to claim 1, characterized in that one of the absorber layers or both absorber layers are formed from silver.

13. The thin-film element according to claim 1, characterized in that one of the absorber layers or both absorber layers are formed from aluminum.

14. The thin-film element according to claim 1, characterized in that the interference layer structure is a symmetrical three-layer structure comprising a first absorber layer, a dielectric spacing layer and a second absorber layer.

15. The thin-film element according to claim 1, characterized in that the interference layer structure is an asymmetrical three-layer structure comprising a first absorber layer composed of a first material, a dielectric spacing layer, and a second absorber layer composed of a second, different material.

16. The thin-film element according to claim 1, characterized in that the dielectric spacing layer is formed from $SiO_x$, or $MgF_2$.

17. The thin-film element according to claim 1, characterized in that, in transmitted light, the thin-film element exhibits, specified in the CIELAB color space, a chroma $C^*_{ab}$ of more than 20.

18. The thin-film element according to claim 17, characterized in that, in transmitted light, the thin-film element exhibits, a chroma $C^*_{ab}$ of more than 25.

19. The thin-film element according to claim 1, characterized in that the thin-film element appears colored in transmitted light and exhibits a color-shift effect.

20. The thin-film element according to claim 1, characterized in that the thin-film element appears colored in transmitted light and, when tilted, is substantially color constant with a changed chroma $C^*_{ab}$.

21. The thin-film element according to claim 1, characterized in that the thin-film element is combined with a color filter.

22. The thin-film element according to claim 21, characterized in that, in a predetermined viewing direction, the thin-film element and the color filter transmit only complementary colors.

23. The thin-film element according to claim 1, characterized in that the thin-film element is present in the form of patterns, characters or a code.

24. The thin-film element according to claim 1, characterized in that the thin-film element is combined with a relief structure.

25. A see-through security element for security papers, value documents and the like, comprising a support and, applied to the support, the thin-film element according to claim 1.

26. The see-through security element according to claim 25, characterized in that the thin-film element is applied to the support in the form of a motif.

27. The see-through security element according to claim 25, characterized in that the thin-film element is provided, on its top opposite the support, with an ink absorption layer.

28. An optically variable color pigment for a printing ink, wherein the pigment is formed by the thin-film element according to claim 1.

29. A data carrier comprising the thin-film element according to claim 1 or a see-through security element comprising a support and, applied to the support, the thin-film element; in which the thin-film element or the see-through security element is arranged in or over a transparent window region or a through opening in the data carrier.

30. The data carrier according to claim 29, characterized in that the data carrier is a value document, such as a banknote.

31. A data carrier comprising the thin-film element according to claim 1 or a see-through security element comprising a support and, applied to the support, the thin-film element; in which the thin-film element or the see-through security element is embedded in the data carrier.

32. The data carrier according to claim 31, characterized in that the data carrier is a value document, such as a banknote.

* * * * *